July 2, 1968        E. H. LAND        3,390,621

PHOTOGRAPHIC FLASHGUN APPARATUS

Filed July 28, 1965        2 Sheets-Sheet 1

INVENTOR.
Edwin H. Land
BY
Brown and Mikulka
ATTORNEYS

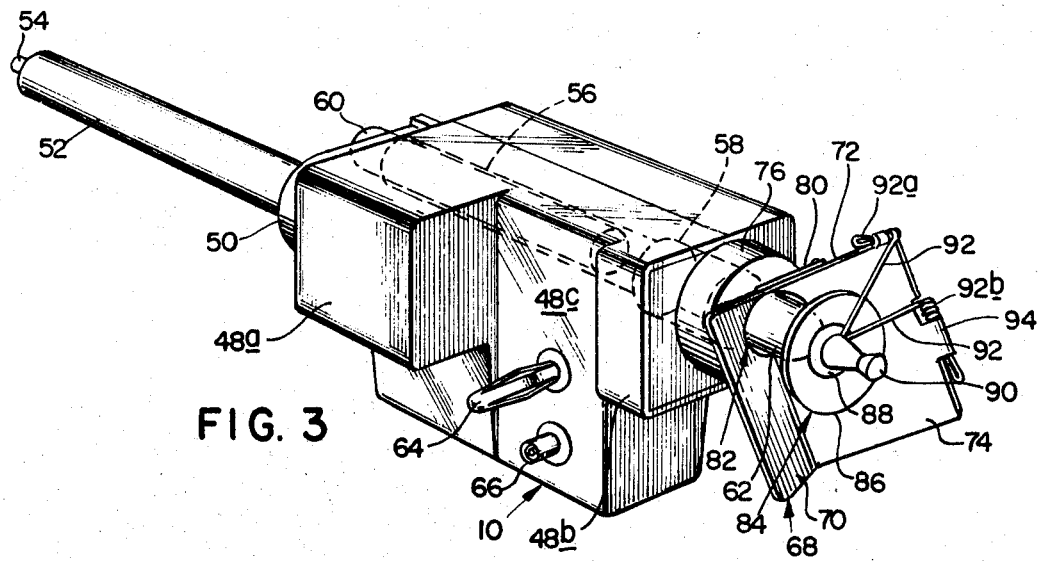
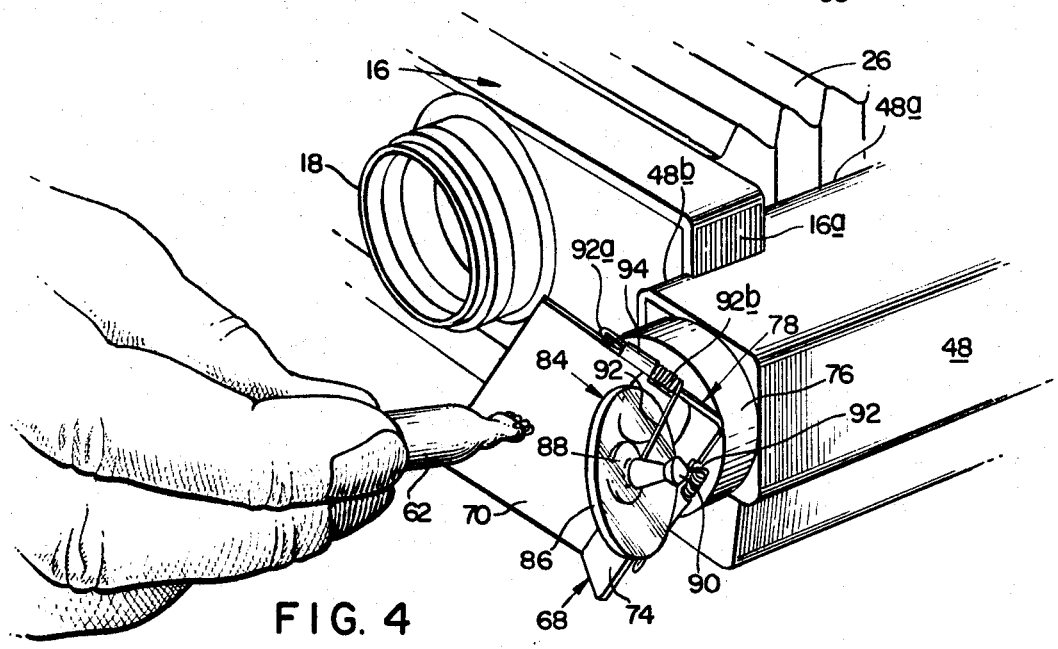

United States Patent Office 3,390,621
Patented July 2, 1968

3,390,621
PHOTOGRAPHIC FLASHGUN APPARATUS
Edwin H. Land, Cambridge, Mass., assignor to Polaroid Corporation, Cambridge, Mass., a corporation of Delaware
Filed July 28, 1965, Ser. No. 475,374
5 Claims. (Cl. 95—11)

ABSTRACT OF THE DISCLOSURE

A flashgun apparatus cooperatively linked to front and rear sections of a folding camera to automatically adjust the light output with distance changes. The apparatus includes a corner-cube reflector fixedly mounted relative to the camera front, a flashbulb movable longitudinally of a bore extending through the apex of the reflector as provided by relative distance adjustments of the camera front and back, and a translationally movable disk positioned in front of and bearing against the flashbulb so as to move therewith and vary the relative amounts of directly-transmitted and reflected light.

---

A flashgun of a type adapted to modification or reconstruction to assume the character of a flashgun of the present invention is described in my copending U.S. patent application, Ser. No. 420,985, filed Dec. 24, 1964. The flashgun thereof, as in the instance of that described in detail herein, is coupled to means identified with relatively movable sections of a camera employed to adjust focus of the camera to camera-to-subject distance. The flashgun includes a reflector in the form of a partial cube and means for moving a flashbulb along the optical axis of the reflector.

The flashgun of the above-referenced patent application automatically provides a generally unaltered distribution and direction of light directed toward a photographic subject, while varying the amount of light thus produced directly with variations of distance to the subject. In this manner it is intended to provide a substantially even level of illumination of the subject at any distance adapted to photoflash operation. However, in operation, this condition is not completely met in that, while the light output, employing a standard type of flashbulb, is satisfactory at the longer ranges of photoflash operation, too great an amount of light is directed toward the subject at the shorter distances. This may be due to one or more of such factors as structural and optical limitations of the flashgun components including the reflector, the output of the flashbulb adapted to use therewith, to camera aperture and shutter characteristics, to the geometry of the camera linkage producing a given range of relative movement of the camera sections to which the flashgun is coupled, and to the speed of the film employed.

The flashgun apparatus of the present invention substantially overcomes the above-described deficiency, mentioned with respect to the flashgun of the referenced patent application, by automatically reducing the light emanating from the flashgun at the shorter distances of photoflash operation to correct levels while maintaining a sufficient output, also, at the maximum distance of operation.

In accordance with the foregoing considerations, an object of the present invention is to provide photographic flashgun apparatus which produces a correct output of light throughout a working range of photoflash operation.

Other objects are to provide photographic flashgun apparatus of the character described which is coupled to relatively movable sections of a camera and which is automatically adjusted to produce correct variations of light output in response to distance adjustments of the camera; to provide photographic flashgun apparatus, as stated, which is adapted to incorporation with cameras of a type having a camera back, an extensible front, and adjustable or flexible means interconnecting the two, as, for example, cameras sold by Polaroid Corporation of Cambridge, Mass., under a series designation identified with the number "100" such as "Model 100," "Model 180," etc.; to provide flashgun apparatus of the aforesaid category which is suitable for use with cameras embodying either automatic photoexposure means involving, for example, a photoelectric cell or photoresponsive resistor or those without said means and including a manually adjustable shutter and diaphragm; to provide photographic flashgun apparatus of the character described which is readily and releasably attachable to a camera; to provide photographic flashgun apparatus, as hereinbefore presented, which incorporates, respectively, a housing member having a central bore, a so-called "corner-cube" reflector, flashbulb mounting means relatively movable along an optical axis passing through the apex of the reflector and centrally of the bore, means adapted to couple the flashbulb mounting means with a relatively adjustable portion of a camera and a disk-like element movably attached to the flashgun, adapted to be positioned across a part of the open face of the reflector or removed therefrom for any purpose, and biased to bear against the tip of a flashbulb inserted in the mounting means so as to move, with movement of the flashbulb, substantially along the optical axis of the reflector; to provide flashgun apparatus, of the character described, wherein the aforesaid disk-like element includes light-modifying means such as blocking, dispersing or filtering means; to provide flashgun apparatus, as stated, in which the disk-like element includes a light-transmitting portion shielding against shattering of a flashbulb; to provide flashgun apparatus of the category outlined wherein the disk-like element is pivotally mounted on the reflector; and to provide flashgun apparatus, of the character designated, having a rugged, relatively simple and inexpensive construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a perspective side view of the flashgun apparatus showing physical and electrical connection means for mounting it on the camera; and FIG. 4 is a fragmentary side view of the flashgun apparatus illustrating a position of elements thereof adapted to the mounting of a flashbulb.

Figure 1:
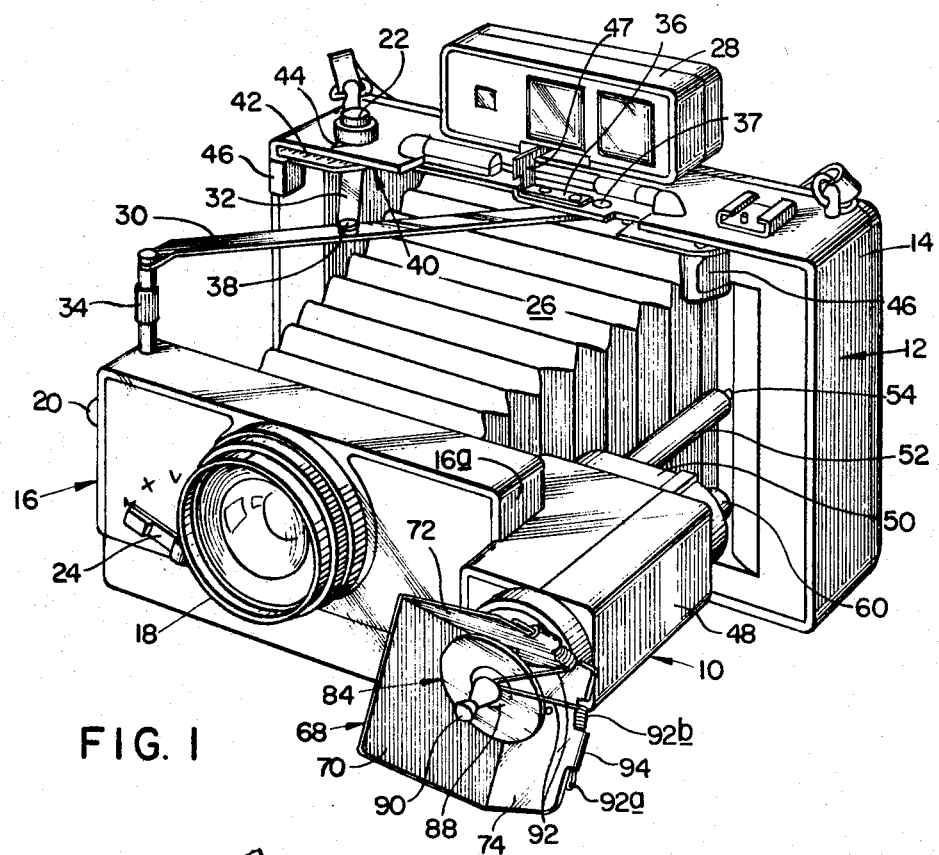
FIGURE 1 is a perspective front view of the flashgun apparatus of the invention operatively mounted on a camera.

Referring now to FIGURE 1, there is shown flashgun apparatus 10 of the invention mounted on one type of camera 12 with which it is adapted to be used, namely, a camera having the designation "Model 180," sold by Polaroid Corporation, embodying manual diaphragm and shutter-speed adjusting means and capable of using either black-and-white or color film, having speeds of, for example 3000 or 75, respectively. The camera comprises a back member 14 wherein each assembly of a film pack is positioned for exposure and, thereafter, subjected to processing treatment; a front member or lens-board 16, mounting a lens assembly 18; shutter and diaphragm mechanism not shown, but having the shutter cocking lever 20 and release button 22; exposure selector means 24; and a flexible bellows 26 interconnecting the members 14 and 16. A viewfinder-rangefinder 28 is shown at operational position. The terms "front" and "rear" or "forwardly" and "rearwardly" are used herein in the sense of proximity to or remoteness from a photographic subject located in front of the camera.

Also interconnecting the camera front 16 and back 14 is linkage which is partially duplicated, top and bottom, assuming the camera to be positioned for horizontal picture taking, as shown, only the top linkage elements 30 and 32 being visible. The link 30 is pivotally attached to a post 34 projecting from the camera front, to a horizontally slidable bar 36 at 37, and to the link 32 at pivot 38. The link 32, in addition to its pivotal connection with link 30 at 38, is pivotally connected at its opposite end, at 40, to means of the camera back.

Figure 2:
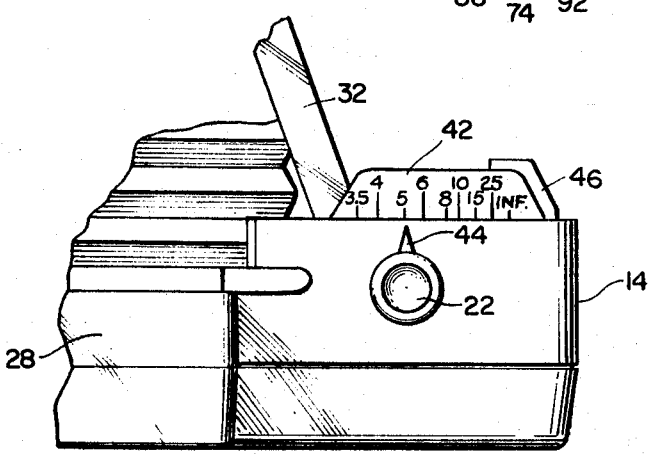
FIG. 2 is a fragmentary, schematic, plan view of focusing adjustment means of a camera with which the flashgun apparatus is employed.

A distance scale 42 including indicia from 3.5 feet to infinity, shown in greater detail in FIG. 2, is integral with the slidable bar 36 and, hence, horizontally movable therewith. In undergoing such movement the indicia of the scale is adapted to be brought into alignment with a fixed index 44. At each extremity of the slidable bar 36 is an actuating button 46 for manually moving the bar to the left or to the right, as shown in FIGURE 1, to increase or lessen the angle at which the link 30 is disposed, thus to effectively lengthen or shorten the spacing between the camera front 16 and back 14 while, coincidentally, the indicia of scale 42 is moved from the more-distant to the less-distant values, and vice versa. Connecting means at 47 is also established between the bar 36 and the finder 28.

As more clearly shown in FIGS. 3 and 4, the flashgun apparatus includes an outer housing member 48, an inner housing member 50 slidably mounted for fore and aft movement in the outer housing, a hollow, tubular, rearwardly-extending element 52, separately attached to the inner housing and having a projecting tip 54 adapted to contact a front surface of the camera back. The inner housing is biased rearwardly by an extension spring, not shown, interposed between the two housing elements, whereby the tip 54 is always in contact with the camera back at any stage of extension or retraction of the inner housing relative to the outer housing. A bore 56, parallel to a forward extension of the axis of the tubular element 52, is formed in the inner housing member 50. A flashbulb socket at 58 and a plunger- or pusher-type of ejector 60 for releasing used flashbulbs are mounted within the bore 56, which is of differential diameter to accommodate the plunger and socket. The outer and inner housings, as well as the body of the socket, are, suitably, composed of a nonconductive material such as an organic plastic. The tubular post 52 serves as a container for two pencil-type batteries for energizing a flashbulb 62. The flashbulb is of an AG–1B type. The forward end of the post 52 is inserted in the inner housing 50 and threadedly connected therewith so that it can be readily removed to provide access to the batteries. The internal structure of the flashgun, including electrical connections to the batteries and socket contact members, is more completely shown in my copending patent application Ser. No. 420,985, hereinbefore referenced.

External electrical connecting means, in the form of the shielded plug 66, are adapted to engage socket means, not shown, mounted at the end 16a of the camera front and to establish electrical connection with the synchronizing flash contacts of the shutter. The outer housing projecting portions 48a and 48b provide a recess 48c therebetween for receiving and engaging the end 16a of the camera front. Thus, the projections 48a and 48b, in conjunction with the aforesaid electrical plugs and sockets, serve to hold the flashgun apparatus firmly mounted on the camera front, as shown in FIGS. 1 and 4.

Uniform distribution and direction of light from the flashbulb 62, when mounted in the socket 58, is produced by a reflector 68, in the form of one-half of a hollow cube, comprising three rectangular, planar plates 70, 72 and 74, each having a specularly-reflecting functional surface, being disposed perpendicularly to the other two, and intersecting the other two along straight lines to assume a generally pyramidal form. Each of the reflector plates, preferably formed, for example, of a metal such as polished aluminum, although conceivably a metalized plastic, is disposed forwardly at 45° to the long axis of a mounted flashbulb. The reflector plates are mounted on a circular web 76, having a triangular aperture 78 formed therein for accommodating their rearmost extremities and three forwardly extending arms 80 attached to the plates. The web is attached to the front of the outer housing 48. A circular opening 82, of a diameter exceeding that of the flashbulb, is provided in the reflector 68, at the apex of the plates which form it and of their lines of intersection, through which the flashbulb 62 is adapted to undergo relative movement, along the optical axis of the reflector.

In accordance with the structure heretofore described, it will be understood that the outer housing 48 and attached reflector 68, being firmly mounted on the camera front 16 move forwardly and rearwardly with it, in response to lateral actuation by the operator of the buttons 46 for adjusting distance settings, and that the flashbulb is always maintained at a fixed spacing relative to the camera back 14 by reason of the intervening and integral post 52, inner housing 50 and flashbulb socket 58. Thus, distance-adjusting movement of the camera front 16 causes movement of the reflector aperture longitudinally of the flashbulb or, otherwise stated, provides relative movement of the flashbulb along the reflector axis. A rearward movement of the camera front 16, in adjusting to greater distances, provides a relatively forward movement of the flashbulb out of the bore, the web aperture, and the reflector aperture, with an accompanying somewhat radial expansion of reflection images of the flashbulb, six in number, and an increase in light output. A forward movement of the camera front 16, when adjusting to shorter distances, produces a relatively rearward movement of the flashbulb into the reflector aperture, the web aperture, and the bore, with a decrease in light output. Thus, the amount of light directed toward the photographic subject is varied in direct proportion to variation of the distance between camera and subject.

As previously intimated, while the output of light, thus produced, is satisfactory at the longer distances adapted to flash photography, say from 6 to 12 feet, it is excessive for the shorter distances and particularly so for the shortest distance of 3½ feet. This condition is remedied by incorporation of the light-modifying element 84 with the components of the flashgun hereinbefore described. The element 84 comprises a composite disk component including a circular, light-transmitting disk 86 composed, for example, of a tough plastic such as an acrylic resin or a hard glass, a circular, opaque, metallic light-diminishing disk 88, a forwardly extending knob-like handle 90, and mounting means therefor. The radially outer areas of the disk 86 serve as a safety shield relative to the flashbulb. The central metallic disk intercepts and blocks the direct rays from the flashbulb and, selectively, some of the reflected rays, especially when the flashbulb is fully retracted. It also contributes to the protective function provided by disk 86. The disk 88 is composed of a relatively thin metal plate having a threaded central aperture and the disk 86 has a small non-threaded aperture at its center. The post 90 includes a threaded rear extremity which passes through the aperture in the disk 86 and engages that in the disk 88. Alternatively, the composite disk 84 could be formed as an integral unit with inner and outer sections.

The mounting component of light-modifying element 84 is attached to the forward extremities of the reflector plates 72 and 74 and consists of a pair of resilient wire arms 92 projecting radially, but at different angles, from the central disk 88. Each arm includes a portion 92a angled at approximately 90° adjacent to its outer extremity. This portion is inserted in a small, overturned, individual tubular connector 94 integral with each reflector plate at a forward edge of the latter and extending parallel to the edge. The angled extremity of each wire is pivotally mounted in the connector 94 whereby the composite disk can be pivoted forwardly and rearwardly, as a unit. The mounting arms 92, as described, form a V-shaped, over-center spring, capable of biasing the composite disk rearwardly into contact with the forward tip of the flashbulb 62 at one position, as shown in FIGURE 1, or to an extreme forward or open position, as shown in FIG. 4. When biased to its rearward position, the composite disk is maintained in firm contact with the forward tip of the flashbulb by reason of its biased condition and as permitted by the pivotal mounting of the mounting arms 92. Each angled extremity 92a of the arms includes a portion in the form of a coil spring 92b which relieves the arm of undue stress during its pivotal movement.

Further considering operations of the flashgun apparatus, incorporating the light-modifying element 84, when the flashbulb is retracted rearwardly within the bore to a maximum degree, the disk component 88 assumes a major function with respect to the light rays, that is, a major proportion of the light output is blocked, because most of these rays are then direct rays obstructed by the disk. As the camera is adjusted to greater distances, the flashbulb emerges forwardly, a larger proportion of the rays are reflected, and a less proportion of the total light output is blocked by the disk 88. The foregoing operations are exactly those required to diminish the light output of the flashgun at short distances of camera-to-subject without cutting down the light output appreciably at the greater distances. Where even more light is required at the maximum distance, the element 84 can be pivoted to open position.

The partial-cube type reflector possesses the advantage that movement of the flashbulb along its axis avoids any change of light distribution and direction. Were the reflector to be of a curved contour, movement of the flashbulb along its axis would tend to alter the distribution of emergent light.

Modification of the metallic disk 88 is possible within the scope of the invention. Thus, for example, the handle 90 may be eliminated and the disk 88 be supplanted by a negative or dispersing type of lens element. This would be advantageous if, for some reason, more light were desired at maximum distances of camera-to-subject. Other modifications include a disk in the form of light reducing means such as a neutral density filter or a fine wire screen. The shape and size of the disk 88 are not inflexible, it being apparent that some deviation from a circular shape, e.g., a hexagonal or octagonal form would be possible and that the size is dependent upon how much of the reflected light is to be eradicated. Instead of the pivotal mounting shown, mounting means permitting an exactly linear movement of the light-modifying element 84 could be employed. It would also be possible to incorporate a light-modifying element with the flashbulb, per se, and achieve a somewhat similar light blocking function, although this is considered less feasible from at least a production viewpoint. A further modification contemplates the central opaque disk 88, as shown, and a separate forwardly-located, light-transmitting protective element, instead of the attached disk 86.

As previously intimated, the flashgun apparatus of the present invention is not restricted to a camera of the particular type shown. For example, the camera illustrated in the patent application hereinbefore referenced is one embodying a shutter mechanism for automatically controlling the photographic exposure, including a photoresponsive resistor for measuring subject brightness. In this instance the outer housing includes a frontal projecting portion which extends across a part of the camera front so as to cover the photoresponsive resistor, this portion carrying a small lamp at its rear surface to provide a constant low illumination of the photoelectric component. Additionally, the web, bearing the reflector, is threadedly mounted in the outer housing so as to permit its rotation and thus vary the axial relation of the flash bulb with respect to the reflector for a trimming purpose. These small deviations from the structure shown herein in no manner alter the basic design and function of components comprised by the flashgun apparatus, as described, it being understood that it may or may not include the resistor-covering and trimming components, depending upon whether the camera incorporates such photoelectric means or whether it is one requiring manual adjustment of the shutter and diaphragm, such as the camera shown in FIGURE 1.

Although the structure described involves holding the flashbulb stationary and moving the outer housing 48 and reflector 68 relative thereto, it will be understood that the inner housing 50 and flashbulb could be thus moved while the outer housing and reflector were held stationary, in a modified construction.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Flashgun apparatus for providing correct illumination of a photographic subject throughout a range of photoflash distances in response to distance adjustments of a camera including fixed and movable components for the purpose on which said apparatus is adapted to be mounted, comprising a reflector for directing light toward said subject including three planar reflecting surfaces each joined to another along two sides and arranged in generally pyramidal form, the joining lines being adapted to intersect at an apex, the optical axis of the reflector extending through the location of said apex with said reflector surfaces disposed substantially at 45° thereto, a generally circular opening formed in the reflector in portions approaching said apex of a size to permit unimpeded longitudinal movement of an elongated flashbulb along said optical axis, socket means for holding said flashbulb within said opening, means including a bore mounting said socket and said reflector for movement relative to one another along said optical axis, and means including a light-modifying element for selectively diminishing the light output of said apparatus positioned forwardly of and aligned with said flashbulb when mounted in said socket, said means mounting said flashbulb socket being biased so as to contact a fixed component of said camera, and said means mounting said reflector being attached to a movable distance-adjusting component of said camera whereby said flashbulb and reflector are adapted to undergo said relative movement in response to distance adjustments of said camera, said light-modifying element being in the form of a disk member of given shape and dimensions and being movably mounted and biased so as to substantially maintain contact with the tip of said flashbulb during said relative movement of said socket and reflector, said light-modifying element being adapted to block at least the direct rays from said flashbulb toward said subject.

2. Flashgun apparatus for providing correct illumination of a photographic subject throughout a range of photoflash distances in response to distance adjustments of a camera including fixed and movable components for the purpose on which said apparatus is adapted to be mounted, comprising a reflector for directing light toward said subject including three planar reflecting surfaces each joined to another along two sides and arranged in generally pyramidal form, the joining lines being adapted to intersect at an apex, the optical axis of the reflector extending through the location of said apex with said reflector surfaces disposed substantially at 45° thereto, a generally circular opening formed in the reflector in portions approaching said apex of a size to permit unimpeded longitudinal movement of an elongated flashbulb along said optical axis, socket means for holding said flashbulb within said opening, means including a bore mounting said socket and said reflector for movement relative to one another along said optical axis, and means including a light-modifying element for selectively diminishing the light output of said apparatus positioned forwardly of and aligned with said flashbulb when mounted in said socket, said means mounting said reflector being a first housing member attachable to an extensible front section of said camera, and said means mounting said flashbulb socket being a second housing member slidably mounted relative to said first housing member whereby said flashbulb, when mounted in said socket, can be extended forwardly of or retracted within said first housing member, said second housing member including a rearwardly-extending element biased for contact with a fixed back section of said camera, and said flashbulb and reflector being thereby adapted to undergo said relative movement in response to distance adjustments of said camera, said light-modifying element being in the form of a disk member of given shape and dimensions and being movably mounted and biased so as to substantially maintain contact with the tip of said flashbulb during said relative movement of said socket and reflector, said light-modifying element being adapted to block at least the direct rays from said flashbulb toward said subject.

3. Flashgun apparatus for providing correct illumination of a photographic subject through a range of photoflash distances in response to distance adjustments of a camera including fixed and movable components for the purpose on which said apparatus is adapted to be mounted, comprising a reflector for directing light toward said subject including three planar reflecting surfaces each joined to another along two sides and arranged in generally pyramidal form, the joining lines being adapted to intersect at an apex, the optical axis of the reflector extending through the location of said apex with said reflector surfaces disposed substantially at 45° thereto, a generally circular opening formed in the reflector in portions approaching said apex of a size to permit unimpeded longitudinal movement of an elongated flashbulb along said optical axis, socket means for holding said flashbulb within said opening, means including a bore mounting said socket and said reflector for movement relative to one another along said optical axis, and means including a light-modifying element for selectively diminishing the light output of said apparatus positioned forwardly of and aligned with said flashbulb when mounted in said socket, said light-modifying element being in the form of a disk member of given shape and dimensions adapted to block at least the direct rays from said flashbulb toward said subject, said disk member including mounting means pivotally attached to said reflector and being so biased as to bear against the tip of the flashbulb, when mounted in said socket, at any position of said flashbulb along said optical axis, said mounting means for said disk member being in the form of a V-shaped, over-center spring attached to the forward edges of a pair of said reflector plates and adapted to be pivoted away from the location of said flashbulb to enable removal of said disk member and access to said socket.

4. Flashgun apparatus for providing correct illumination of a photographic subject throughout a range of photoflash distances in response to distance adjustments of a camera including fixed and movable components for the purpose on which said apparatus is adapted to be mounted, comprising a reflector for directing light toward said subject including three planar reflecting surfaces each joined to another along two sides and arranged in generally pyramidal form, the joining lines being adapted to intersect at an apex, the optical axis of the reflector extending through the location of said apex with said reflector surfaces disposed substantially at 45° thereto, a generally circular opening formed in the reflector in portions approaching said apex of a size to permit unimpeded longitudinal movement of an elongated flashbulb along said optical axis, socket means for holding said flashbulb within said opening, means including a bore mounting said socket and said reflector for movement relative to one another along said optical axis, and means including a light-modifying element for selectively diminishing the light output of said apparatus positioned forwardly of and aligned with said flashbulb when mounted in said socket, said means mounting said reflector being a first housing member attachable to an extensible front section of said camera, and said means mounting said flashbulb socket being a second housing member slidably mounted relative to said first housing member whereby said flashbulb, when mounted in said socket, can be extended forwardly of or retracted within said first housing member, said second housing member including a rearwardly-extending element biased for contact with a fixed back section of said camera, said light-modifying element being in the form of a disk member of given shape and dimensions and being movably mounted and biased so as to substantially maintain contact with the tip of said flashbulb during said relative movement of said socket and reflector, said light-modifying element being adapted to block at least the direct rays from said flashbulb toward said subject, said camera being of a type including, in addition to said front and back sections, a bellows, relatively movable indicia means for establishing distance settings, and manually adjustable linkage interconnecting said back and front sections for, respectively, moving the latter section to obtain distance adjustments of said camera, for moving said indicia means, and for providing a concurrent relative movement of said flashgun reflector and flashbulb socket which is predetermined with respect to the direction and extent of movement of said indicia means.

5. Flashgun apparatus, as defined in claim 4, wherein said front section of the camera on which it is adapted to be mounted contains lens, shutter, and diaphragm means, the optical axes of said lens means and flashgun reflector being substantially parallel when the flashgun is thus mounted.

References Cited

UNITED STATES PATENTS

| | | | |
|---|---|---|---|
| 1,987,705 | 1/1935 | Pedersen | 240—103 |
| 2,205,860 | 6/1940 | Olds | 240—1.3 |
| 2,213,749 | 9/1940 | Strauss | 95—11 |
| 3,109,595 | 11/1963 | Bohme | 240—1.3 |
| 3,111,274 | 11/1963 | Turano | 95—11.5 XR |
| 3,316,398 | 4/1967 | Dayton et al. | 240—1.3 XR |

NORTON ANSHER, *Primary Examiner.*

JOHN M. HORAN, *Examiner.*

FRED L. BRAUN, *Assistant Examiner.*